Patented May 23, 1944

2,349,596

UNITED STATES PATENT OFFICE 2,349,596

PURIFICATION OF CAUSTIC SODA

Irving E. Muskat, Akron, Ohio, assignor to Pittsburgh Plate Glass Company, Alleghany County, Pa., a corporation of Pennsylvania No Drawing. Application March 25, 1940, Serial No. 325,787

3 Claims. (Cl. 23—184)

This invention relates to the purification of various compounds by treatment with liquid ammonia. Of particular interest is the treatment of alkali metal hydroxides, especially sodium hydroxide, to remove undesired impurities which occur in these materials as an incident of their manufacture.

Caustic soda solutions, as initially produced, in commercial processes, are relatively dilute solutions, the concentrations of which are, in general, from 8 to 12 percent by weight. These solutions are contaminated with a large number of impurities, such as sodium sulphate, sodium chloride, chlorates, iron, etc., which must be removed in order to produce a commercially satisfactory product.

Somewhere in the neighborhood of a 45-50 percent concentration is the point of minimum solubility of many of these impurities in caustic solution, and since the production of concentrated caustic is necessary in any event, the usual practice is to concentrate the impure caustic to this concentration and remove these impurities by settling and filtration. Thereafter, when anhydrous caustic is desired, the solution is evaporated to thet anhydrous state. The product thus produced from diaphragm electrolytic caustic, however, contains about 2 percent by weight of sodium chloride which is undesirable for many purposes. In accordance with my invention, I have found that sodium chloride and/or sodium chlorate may be removed from anhydrous caustic by treatment with liquid ammonia. If the ammonia used is substantially anhydrous, the purified caustic will be substantially anhydrous. In many cases, however, it is desirable to conduct the purification with mixtures of liquid ammonia and water in order to secure a more efficient purification. In such a case the purified caustic may be in the form of solid aqueous hydroxide or of an aqueous solution, the final product being dependent upon the amount of water and ammonia used and the temperature of operation.

In accordance with my invention, I have found that solid caustic of high concentration and which may contain little or no water may be treated with sufficient ammonia and water to cause dilution of the caustic and consequent formation of a pair of liquid phases. In such a case, the mixture, if allowed to stand, forms a pair of layers the upper of which contains a major portion of the ammonia and sodium chloride, some water and some sodium hydroxide. The lower layer contains the major portion of the sodium hydroxide and the remainder of the water and ammonia. Upon separation of the two layers and removal of ammonia from the lower layer, the sodium hydroxide recovered is found to be greatly purified. The concentration of caustic in the lower layer may be regulated by controlling the amount of water introduced and may be as low as 50 to 70 percent by weight, after removal of ammonia. If desired, however, the temperature or the water concentration may be maintained sufficiently low to permit formation of solid in equilibrium with two liquid phases, and in such a case a substantially more concentrated product may be produced by combining a portion of the solid with the lower layer.

In accordance with a further modification, the process may be conducted at a temperature sufficiently low, for example, 20 to 35° C., to permit formation of a solid hydrate without formation of two liquid phases.

The temperature to be maintained is dependent upon the results desired. Thus, if the formation of two liquid phases is desired, the temperature preferably is maintained above about 35° C. and in general, 50 to 75° C. If a separation of two liquid phases is considered undesirable, however, the temperature is maintained below about 35° C.

The amount of ammonia and water used is dependent upon the process being used. Where two liquid phases are to be formed, it is preferred that the amount of water should not exceed about 3 parts of water per part of ammonia, and ammonia in amounts from 0.2 to about 10 parts per part of sodium hydroxide may be used, if desired. If precipitation of hydrates without separation of two liquid phases is desired, substantially more water may be used.

The process may be conducted in various types of closed vessels and processes and apparata such as are described in my copending application Serial No. 179,334, filed December 11, 1937, may be used. The following examples are illustrative:

*Example I*

One part of anhydrous sodium hydroxide containing about 2 percent by weight of sodium chloride was agitated with 2.4 parts of a mixture containing 55 percent ammonia and 45 percent water at 60° C. The mixture was allowed to settle into a pair of layers and upon withdrawing the lower layer and removing the ammonia, a solution containing 55 percent NaOH and 0.2 percent NaCl was secured.

*Example II*

The process of Example I was repeated and the mixture was allowed to cool to 25° C. whereupon the liquid phases merged and a solid hydroxide precipitated. Upon recovery this solid contained 64 percent NaOH and 0.3 percent NaCl.

While the present invention has been described with particular reference to sodium hydroxide, it may also be applied to treatment of other alkali metal hydroxide such as potassium or lithium hydroxide.

Although the present invention has been described in connection with the specific details of certain embodiments thereof, it is not intended that such details shall be regarded as limitations upon the scope of the invention, except insofar as included in the accompanying claims.

This application is a continuation-in-part of my application Serial No. 179,335, filed December 11, 1937.

I claim:

1. A method of treating impure anhydrous sodium hydroxide containing up to about 2 percent by weight of sodium chloride which comprises contacting the same with water and sufficient liquid ammonia to insure separation of a pair of liquid phases, the first of which contains the major portion of the ammonia and of said impurities, water and some sodium hydroxide, and the second of which contains the major portion of said sodium hydroxide and separating the first phase from the second phase.

2. A method of treating impure anhydrous sodium hydroxide containing impurities which comprises contacting the same with water and sufficient liquid ammonia to insure separation of a pair of liquid phases, the first of which contains the major portion of the ammonia and of said impurities, water and some sodium hydroxide, and the second of which contains the major portion of said sodium hydroxide, cooling the system to cause the two liquid layers to merge and to cause precipitation of solid purified hydroxide and removing the hydroxide which is purified as to said chloride.

3. A method which comprises contacting anhydrous alkali metal hydroxide containing as an impurity a salt of an alkali metal and chlorine with water and sufficient liquid ammonia to insure separation of a pair of liquid phases, the first of which contains the major portion of the ammonia and of such salt together with some of said hydroxide and the second of which contains a major portion of said hydroxide and said salt in concentration substantially less than that present in the initial hydroxide based upon the alkali metal hydroxide concentration, separating the two phases and recovering the alkali metal hydroxide from the second phase.

IRVING E. MUSKAT.